(12) United States Patent
Billet

(10) Patent No.: US 11,753,096 B2
(45) Date of Patent: Sep. 12, 2023

(54) ADJUSTABLE INTERIOR BICYCLE STAND

(71) Applicant: Douglas Billet, Atlanta, GA (US)

(72) Inventor: Douglas Billet, Atlanta, GA (US)

(73) Assignee: TriMidtown, LLC, Phoenix, AZ (US)

( * ) Notice: Subject to any disclaimer, the term of this patent is extended or adjusted under 35 U.S.C. 154(b) by 0 days.

(21) Appl. No.: 17/502,901

(22) Filed: Oct. 15, 2021

(65) Prior Publication Data

US 2022/0119058 A1 Apr. 21, 2022

Related U.S. Application Data

(60) Provisional application No. 63/092,881, filed on Oct. 16, 2020.

(51) Int. Cl.
*B62H 3/04* (2006.01)
*B25H 1/00* (2006.01)
*B25B 5/00* (2006.01)

(52) U.S. Cl.
CPC ............... *B62H 3/04* (2013.01); *B25B 5/006* (2013.01); *B25H 1/0014* (2013.01)

(58) Field of Classification Search
CPC ... B62H 3/00; B62H 3/04; B62H 3/12; B62H 3/08; B62H 3/06; A47F 5/04; A47F 5/06; B25H 1/0007; B25H 1/0014; B25B 5/147; B25B 5/006; B25B 5/10; B25B 5/108; B25B 5/104; B25B 5/14; B25B 5/163; B23Q 3/06; B23Q 3/064; B23Q 2703/02
See application file for complete search history.

(56) References Cited

U.S. PATENT DOCUMENTS

| | | | | |
|---|---|---|---|---|
| 5,067,268 A | * | 11/1991 | Ransom | F41A 23/14 89/37.11 |
| 5,107,599 A | * | 4/1992 | Marincic | G01B 5/0004 269/45 |
| 5,605,321 A | * | 2/1997 | Jarvis | B25H 1/0014 269/130 |
| 6,190,290 B1 | * | 2/2001 | Mackert | B62H 3/08 482/61 |
| 6,382,480 B1 | | 5/2002 | Egly et al. | |
| 6,575,310 B2 | * | 6/2003 | Chamoun | B66F 7/243 211/20 |
| 6,880,817 B2 | * | 4/2005 | Clarke | B25B 11/005 269/97 |

(Continued)

FOREIGN PATENT DOCUMENTS

EP 3081342 A1 * 10/2016 ........... B25H 1/0007
KR 101302923 9/2013

*Primary Examiner* — Ko H Chan
(74) *Attorney, Agent, or Firm* — Stephen E. Kelly; Thomas J. Banks; Hill Ward Henderson, P.A.

(57) ABSTRACT

An adjustable interior bicycle stand for storing a bicycle in the interior of a vehicle during transportation. The adjustable interior bicycle stand comprises a base and vertical supports. The base further comprises a first set of holes and a second set of holes for housing the vertical supports. The vertical supports further comprise an anchor end and a support end. The anchor end of the vertical supports being seated in the combination of the first and second set of holes of the base. The support end of the vertical supports further comprises an adjustment means and a cradle. The vertical supports further comprising an elevating means for adjusting the location of the cradle in distal relation to the base.

11 Claims, 11 Drawing Sheets

(56) References Cited

U.S. PATENT DOCUMENTS

| | | | | |
|---|---|---|---|---|
| 7,356,960 | B1* | 4/2008 | Knitt | F41A 23/16 |
| | | | | 89/37.04 |
| 8,342,495 | B2* | 1/2013 | Weissenborn | B25B 27/0071 |
| | | | | 269/45 |
| 8,931,648 | B1 | 1/2015 | Tam | |
| 9,233,463 | B2* | 1/2016 | Erickson | B25H 1/0014 |
| 10,420,292 | B1* | 9/2019 | Ehlers | B27B 21/00 |
| 10,589,693 | B2 | 3/2020 | Stechschulte | |
| 2012/0119427 | A1* | 5/2012 | Weissenborn | A63C 11/04 |
| | | | | 269/95 |
| 2017/0174485 | A1* | 6/2017 | Vogel | B66F 5/04 |
| 2022/0099239 | A1* | 3/2022 | Green | B25H 1/0007 |

\* cited by examiner

ADJUSTABLE INTERIOR BICYCLE STAND

CROSS-REFERENCE TO RELATED APPLICATION

Pursuant to 35 U.S.C. § 119(e), this application claims the benefit of U.S. Provisional Patent Application Ser. No. 63/092,881, filed on Oct. 16, 2020, the entire contents of which are incorporated herein by this reference.

BACKGROUND

(1) Field of Endeavor

The present invention relates generally to the field of bicycle stands, and more particularly, to a unique stand for safely storing a bicycle within a moving vehicle during travel.

(2) Description of Related Art

Avid cyclist and triathletes tend to transport their bikes inside their vehicles while traveling to riding locations or races. Many cyclist invest thousands of dollars in their bikes. Transporting these bikes internally provides the cyclist with peace of mind knowing that the bicycle is protected from damage, weather, and theft. When a bicycle is stored inside a vehicle and laid on its side, there is high potential for damage to the drive train due to the weight of the bike being awkwardly placed on the rear wheel or on a single pedal.

Past stands and racks are generally meant for exterior use on a vehicle, and they leave bicycles exposed to the elements or potential theft. These stands and racks typically involve storing the bicycle on the roof of the vehicle or the rear of a vehicle, thereby exposing it to possible damage from hazards external to the vehicle.

The present invention seeks to overcome these problems by providing a stand that removes the force applied to the bicycle chassis during travel while simultaneously holding the bicycle in place in the interior of a vehicle.

SUMMARY OF THE PREFERRED EMBODIMENTS

In one embodiment, the adjustable interior bicycle stand described herein comprises a base, a vertical support, and a radial member. The base has a top and a bottom, the bottom having a rubber or other non-slip surface. The vertical support has an anchor end and a support end. The anchor end of the vertical support has an elevating means and the support end has a cradle, an adjustment means, and a securement means. In one embodiment, the securement means is a securement band. The radial member has a first set of holes that make up a first position and a second set of holes that make up a second position.

DETAILED DESCRIPTION OF THE PREFERRED EMBODIMENTS

With reference to the drawings, the adjustable interior bicycle stand will now be described with regard for the best mode and the preferred embodiment. In general, the device is an adjustable interior bicycle stand for removably supporting a bicycle inside a moving vehicle. The embodiments disclosed herein are meant for illustration and not limitation of the invention. An ordinary practitioner will appreciate that it is possible to create many variations and combinations of the following embodiments without undue experimentation.

Figure 1:
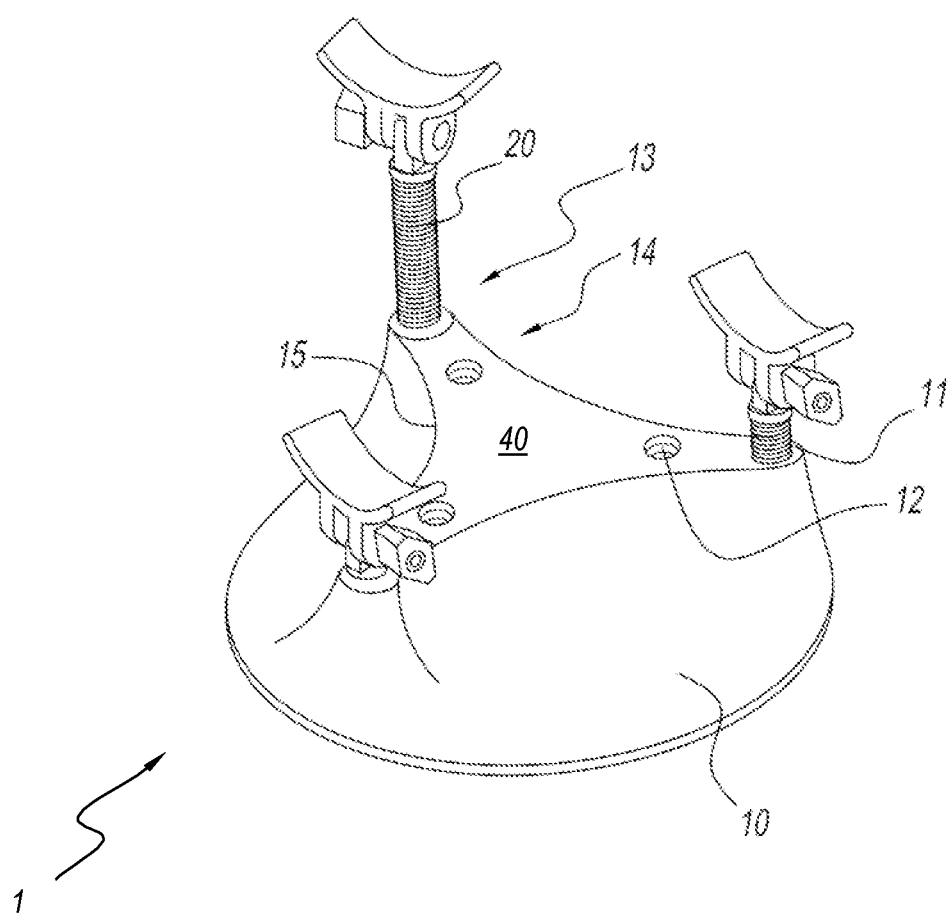
FIG. 1 is an isometric view of one embodiment of the adjustable interior bicycle stand.
Figure 2:
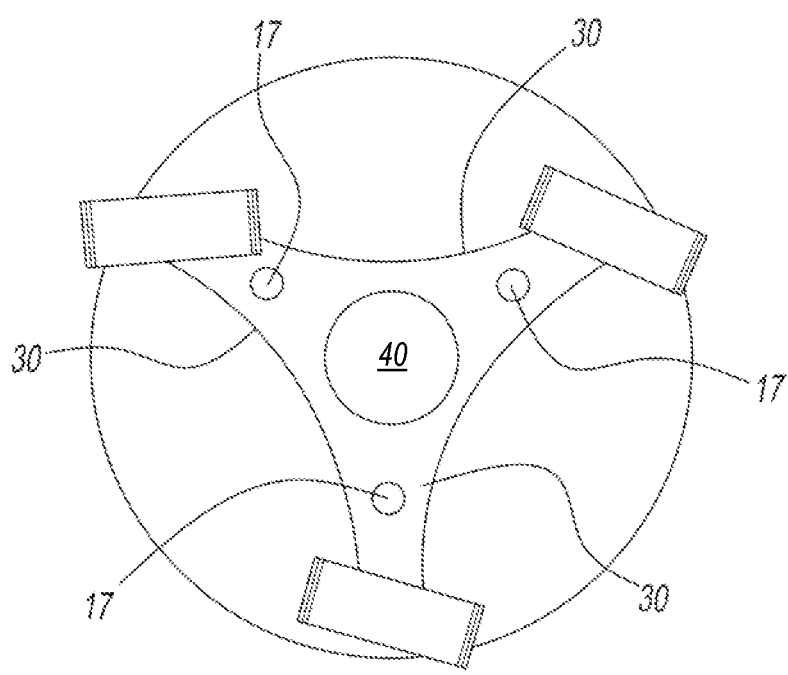
FIG. 2 is a top view of one embodiment of the adjustable interior bicycle stand.
Figure 3:
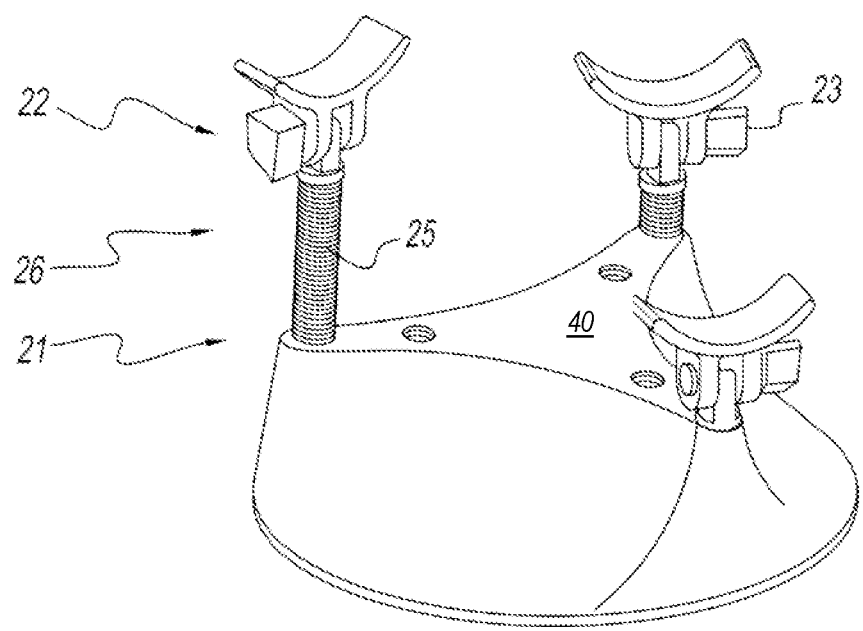
FIG. 3 is an isometric view of one embodiment of the adjustable interior bicycle stand.
Figure 11:
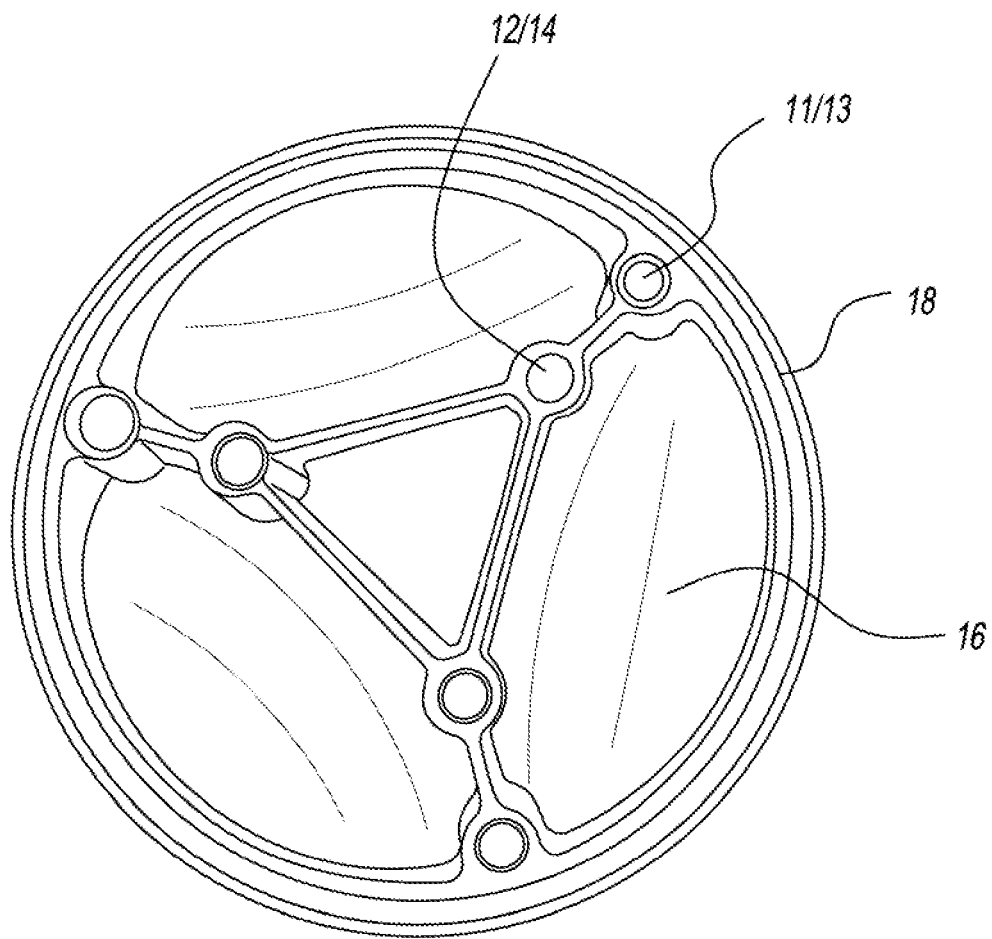
FIG. 11 shows a bottom view of one embodiment of the bicycle stand.
Figure 12:
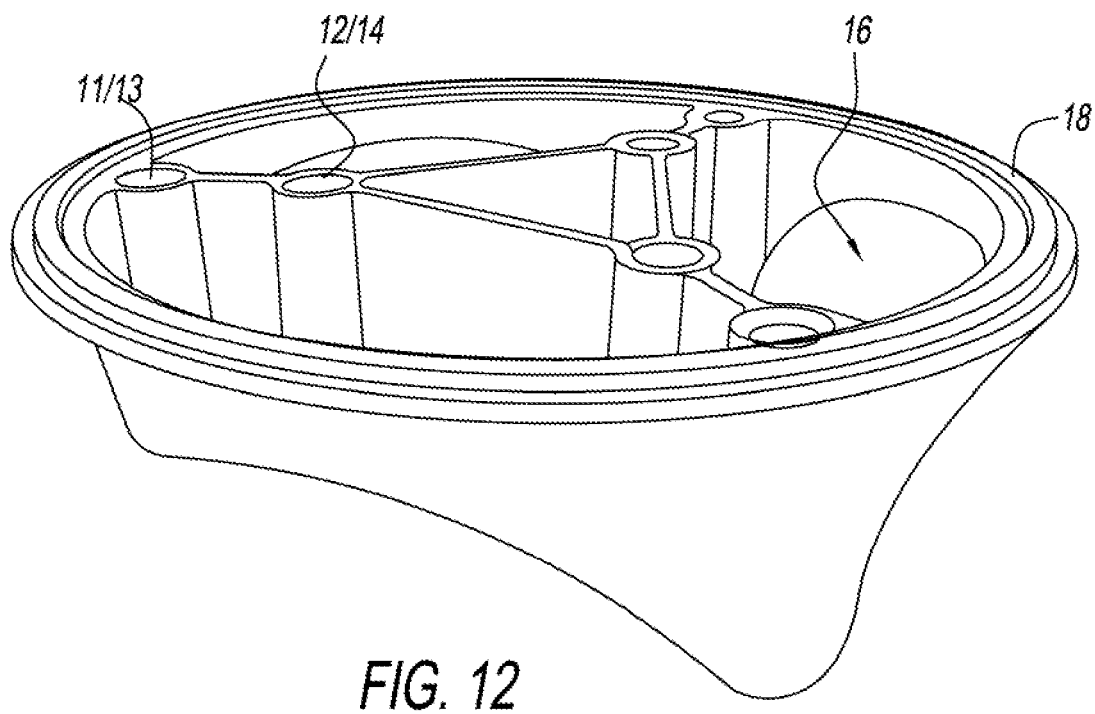
FIG. 12 shows a perspective bottom view of one embodiment of the bicycle stand.
Figure 13:
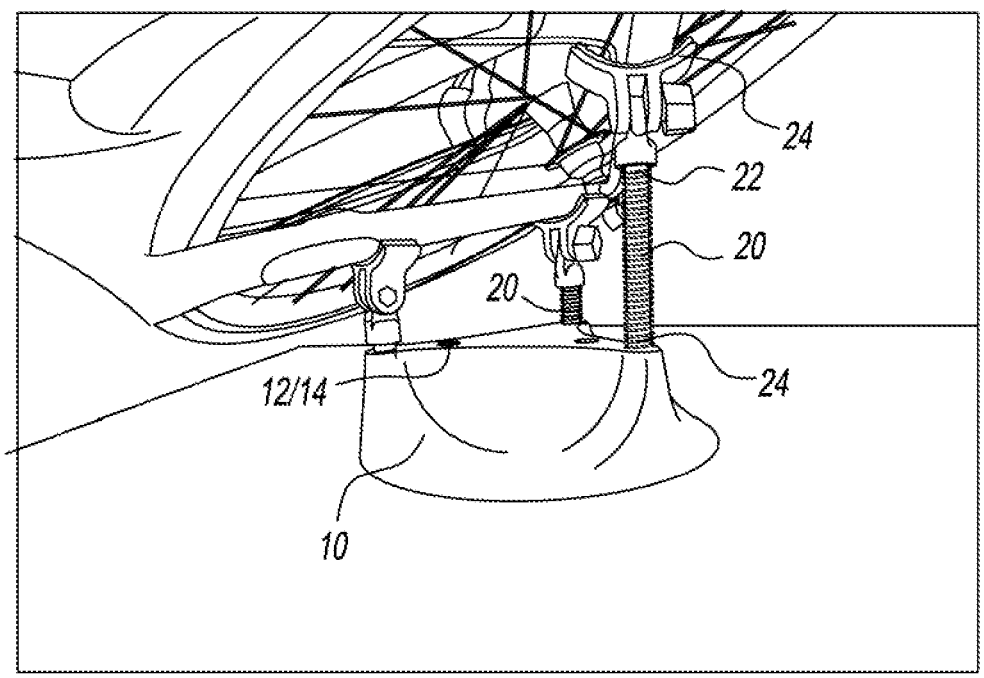
FIG. 13 shows one embodiment of the adjustable interior bicycle stand installed in a vehicle with a bicycle supported by the stand.

Referring to FIGS. 1-3, the adjustable interior bicycle stand 1 comprises a base 10 and three or more vertical supports 20. The base 10 comprises a bottom 16 having a non-slip surface 18 (see FIG. 11) and a top 15 having a center 40 and one or more radial members 30. In one embodiment, each radial member 30 extends outwardly from the center 40, and each of the radial members 30 is disposed with equal angular displacement in relation to each adjacent radial member 30. One embodiment of the non-slip surface 18 is a rubber member or another member capable of gripping the floor of the vehicle in a nondestructive manner to prevent the bicycle stand 1 from sliding. The radial members 30 further comprise a first set of holes 11 and a second set of holes 12 that are located at a first position 13 and a second position 14, respectively. The first set of holes 11 are spaced from each other such that they form a triangle shape when viewed from a top perspective. The second set of holes 12 are also spaced from each other such that they form a triangle shape when viewed from a top perspective, within the triangle formed by the first set of holes 11. In other words, the second set of holes 12 has a smaller radius to the center 40 of the top 15 than that of the first set of holes 11. In one embodiment of the base 10, the radial members 30 are contours raised from the base 10 that provide flat surfaces for anchoring the vertical supports 20. In one embodiment of the base 10, there may be four or more radial members 30.

Each hole of the first set of holes 11 and the second set of holes 12 is fitted such that it can removably receive vertical supports 20. In one embodiment of the base 10, the first set of holes 11 may comprise a retaining mechanism, such as a threaded region 17 to receive and retain a vertical support 20. In one embodiment of the base 10, the second set of holes 12 may possess a retaining mechanism, such as a threaded region 17 to receive a vertical support 20.

In one embodiment of the base 10, each vertical support 20 may be anchored in one of a plurality of positions along the radial member 30. In another embodiment of the base 10, the location of the vertical supports 20 may be slidably adjustable along the length of the radial members 30. For example, each of the radial members 30 may comprise a track or a slot for slidably receiving the first set of holes 11 and/or the second set of holes 12 such that the location of each hole in the first and second set of holes 11/12 is radially adjustable along the radial members 30. Thus, the vertical supports 20 may be radially and slidably adjustable between the first position 13 and the second position 14.

Referring again to FIGS. 1-3, the base 10 supports three or more vertical supports 20, each of which have a cradle 24 for supporting the frame of the bicycle. The vertical supports 20 comprise a means for adjusting the elevation 25 of the cradle 24, the elevating means 25 being a threaded rod 26 that mates with the threading means 17 in the base 10. In one embodiment of the vertical supports 20, the elevation means 25 is a telescoping tube having quick release lever locks, twist locks, or other equivalent quick release locking structures can be used as the elevating means 25.

The three vertical supports 20 each contain an anchor end 21 and a support end 22. Each anchor end 21 is seated into any combination of the first set of holes 11 or the second set of holes 12, and the particular combination of the holes is selected to accommodate the geometry of the bicycle frame members being supported. The support end 22 of each vertical support 20 is connected to an adjustment means 23 and the cradle 24. The adjustment means 23 is a latch, quick release, nut and bolt, wing nut, or an equivalent mechanism used to adjust the angle of the cradle 24 to accommodate the particular angle of the bicycle frame member that is seated in the cradle 24. The cradle 24 may further comprise a securement means 27, which is a means for releasably securing the frame to the cradle 24. The securement means 27 may be a rubber band or another elastic member attached to the support end 22 or to the cradle 24 and configured for elastically and releasably securing the frame to the cradle.

Figure 4:
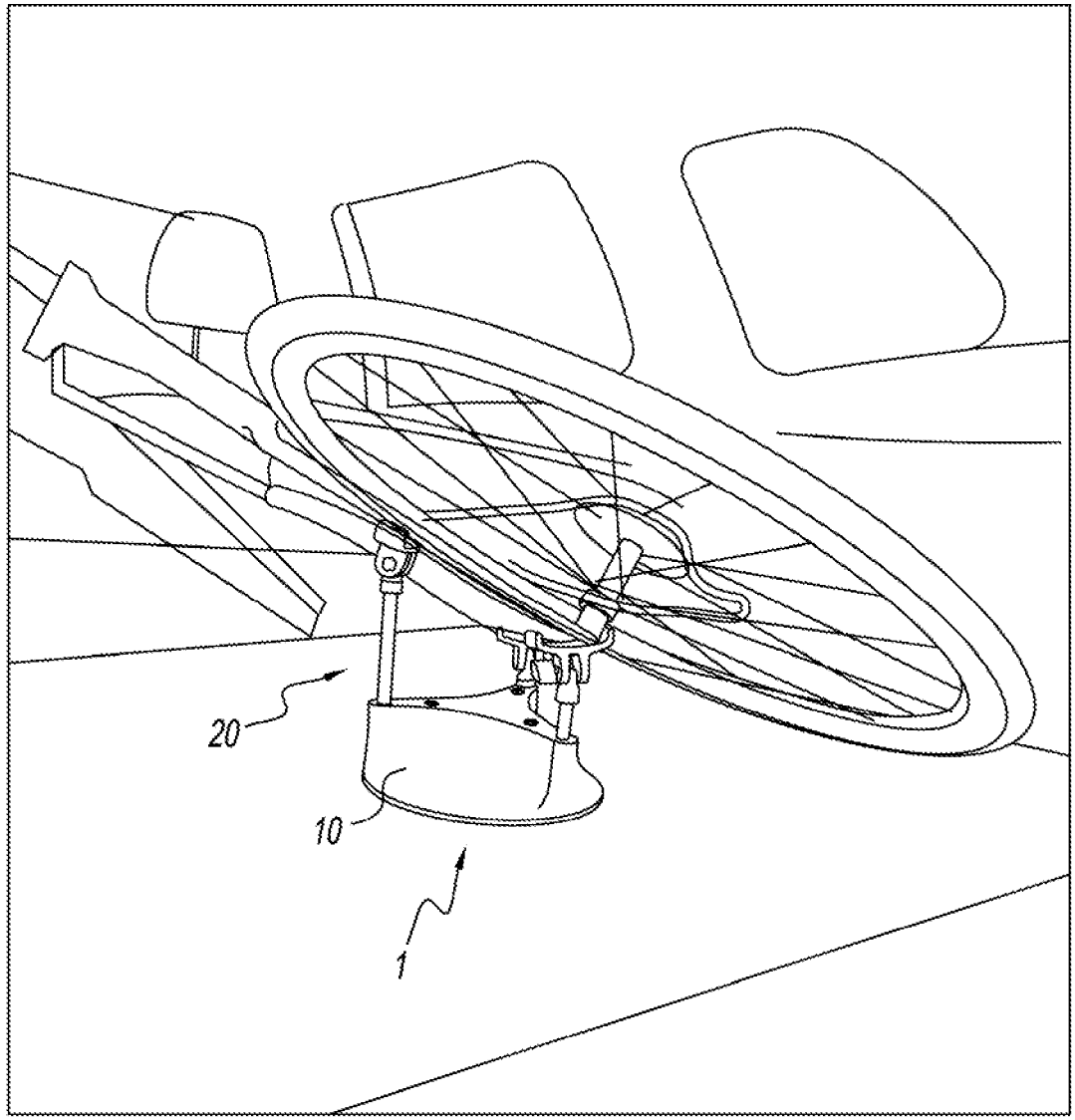
FIG. 4 shows one embodiment of the adjustable interior bicycle stand installed in a vehicle with a bicycle supported by the stand.
Figure 5:
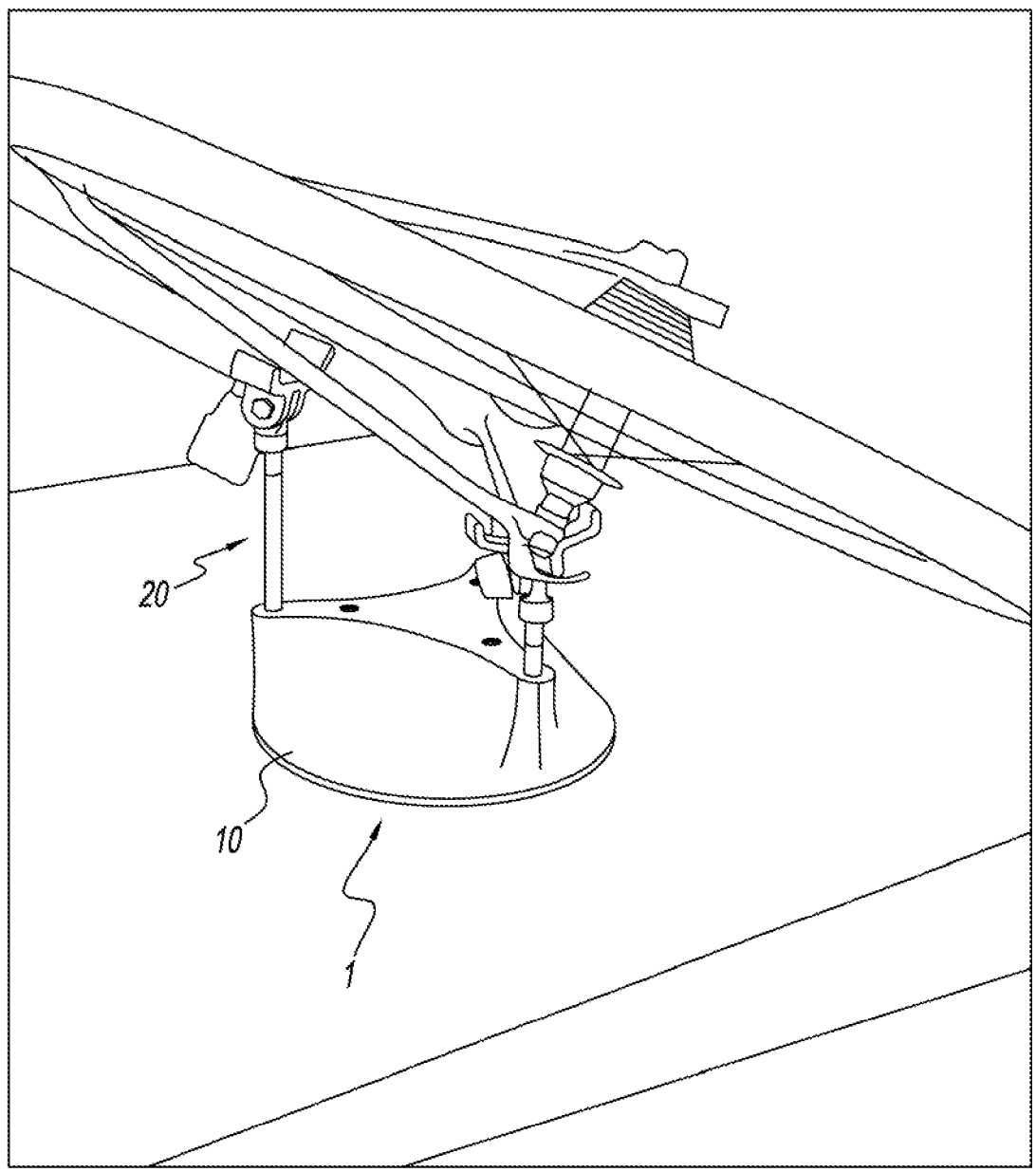
FIG. 5 shows one embodiment of the adjustable interior bicycle stand installed in a vehicle with a bicycle supported by the stand.
Figure 6:
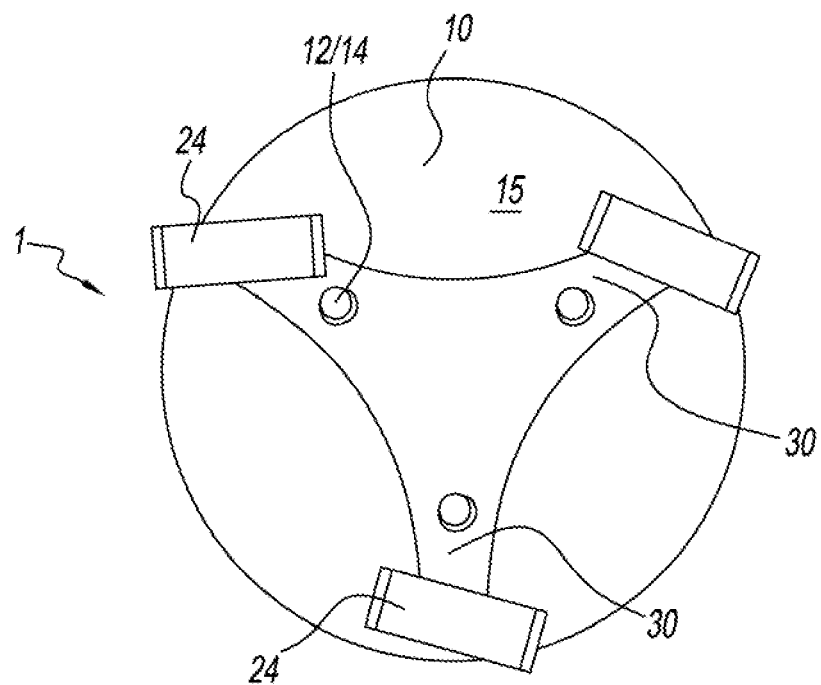
FIG. 6 shows an alternate top view of one embodiment of the bicycle stand.
Figure 7:
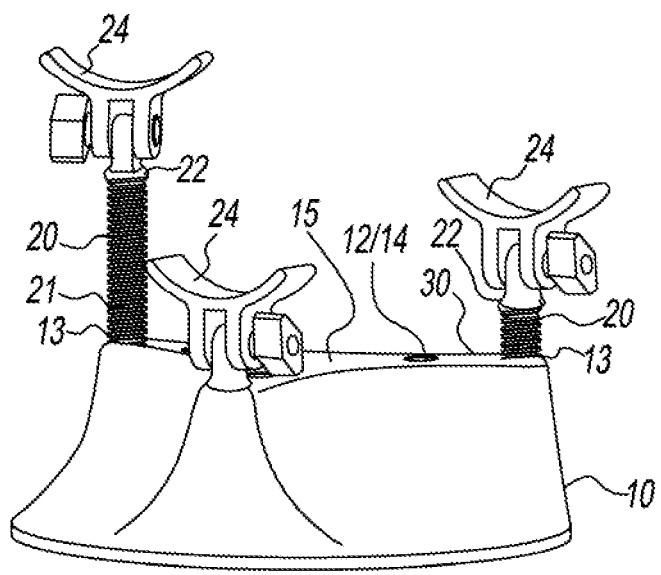
FIG. 7 shows a side view of one embodiment of the bicycle stand.
Figure 8:
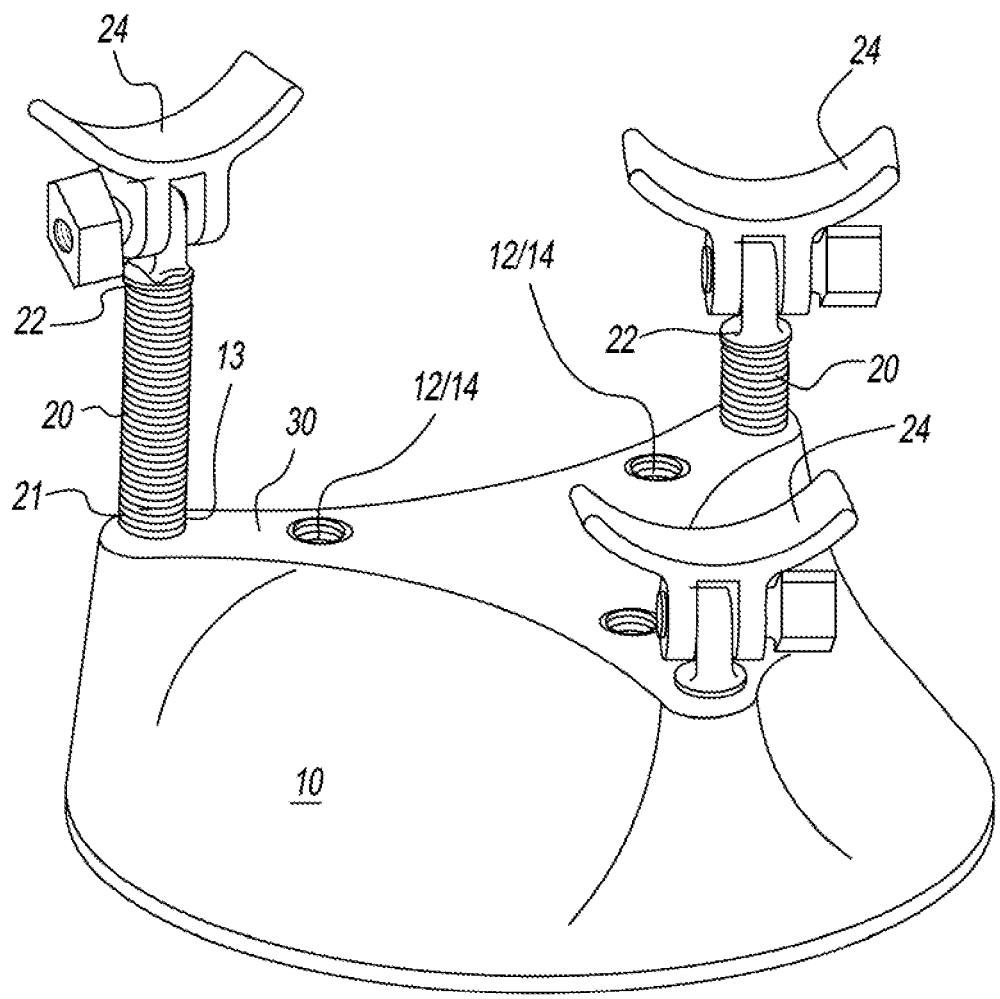
FIG. 8 shows an alternate perspective view of one embodiment of the bicycle stand.
Figure 9:
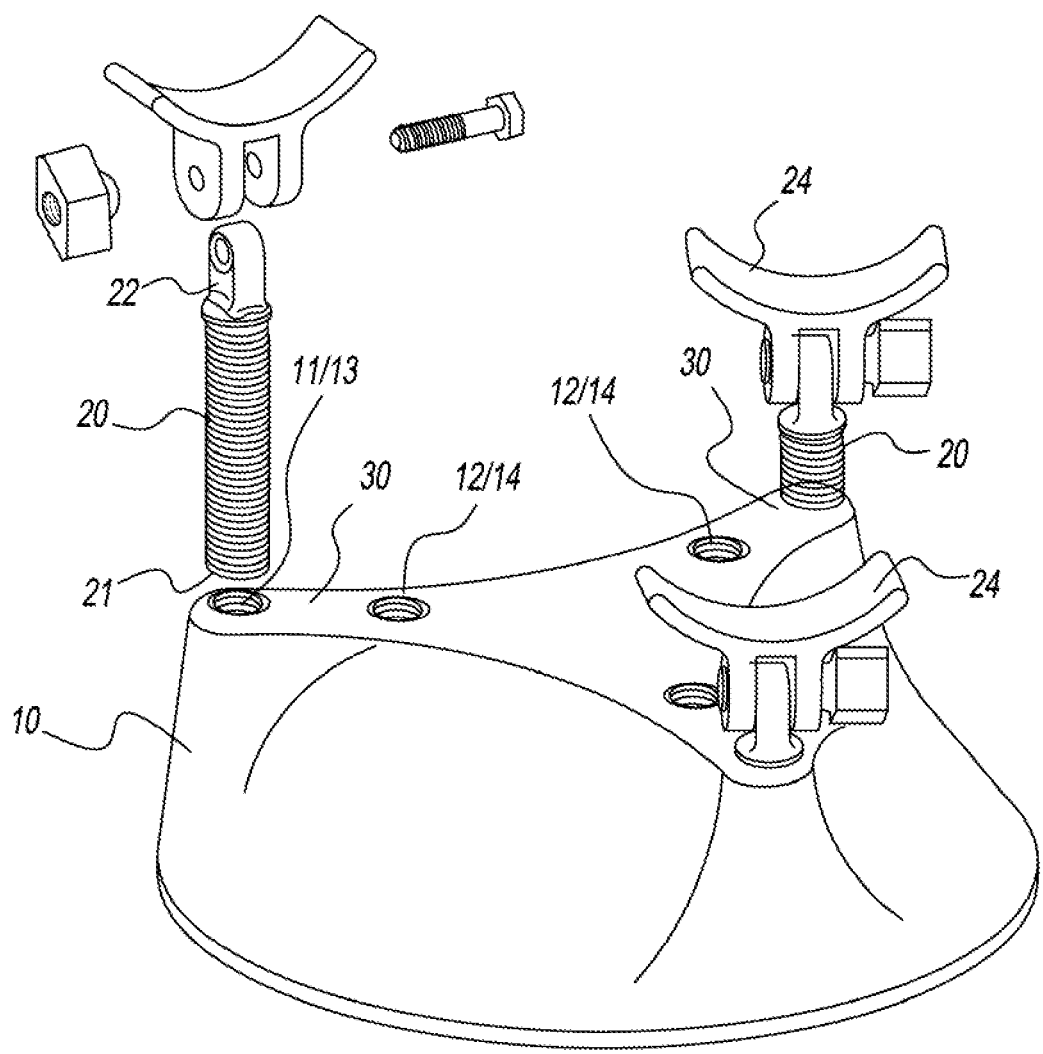
FIG. 9 shows and exploded view of one embodiment of the bicycle stand.
Figure 10:
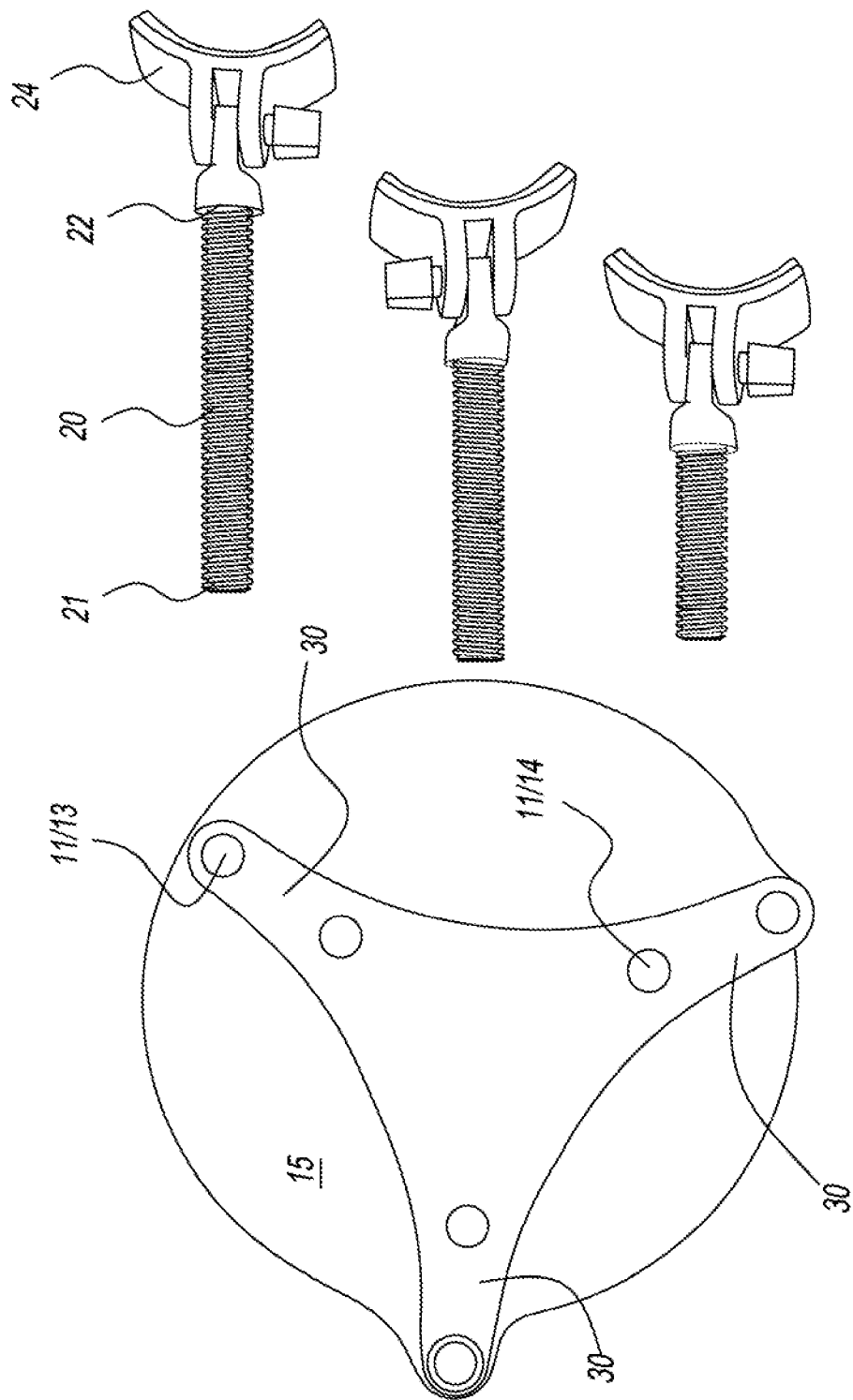
FIG. 10 shows a top view of one embodiment of the base with the vertical supports removed from the radial members.

Referring to FIGS. 4-5, the base 10 is set inside the vehicle. The three elevating means 25 are placed into a combination of either the first set of holes 11 or the second set of holes 12. The height of the vertical supports 20 is adjusted via the elevating means 25 such that when frame elements of a bicycle chassis are placed in the respective cradles 24, the bicycle stand supports the weight of the bicycle. This suspends the bicycle frame and pedals, thereby isolating the bicycle drive train and other sensitive components from damaging forces caused by weight shifting while the vehicle is in motion.

The foregoing embodiments are merely representative of the adjustable interior bicycle stand and not meant for limitation of the invention. For example, persons skilled in the art would readily appreciate that there are several embodiments and configurations of the base, vertical supports, adjustment means, and elevating means that will not substantially alter the nature of the adjustable interior bicycle stand. Consequently, it is understood that equivalents and substitutions for certain elements and components set forth above are part of the invention described herein, and the true scope of the invention is set forth in the claims below.

What is claimed is:

1. An adjustable interior bicycle stand for securing a bicycle inside a moving vehicle, the adjustable interior bicycle stand comprising:
    a base having a top with a center and at least three radial members, each radial member extending outwardly from the center, and each of the radial members being disposed with equal angular displacement in relation to each adjacent radial member, the radial members further comprising a first set of holes and a second set of holes; and
    a plurality of vertical supports, each vertical support disposed in a hole of either the first set of holes or the second set of holes, each vertical support having a cradle and an elevating means for adjusting the distal location of the cradle in relation to the base.

2. The adjustable interior bicycle stand of claim 1, wherein the base further comprises a bottom having a non-slip surface.

3. The adjustable interior bicycle stand of claim 2, wherein the elevating means is a threaded rod.

4. The adjustable interior bicycle stand of claim 3, wherein the first set of holes comprises further a threading means.

5. The adjustable interior bicycle stand of claim 1, wherein the base further comprises a bottom having a non-slip surface.

6. An adjustable interior bicycle stand for securing a bicycle, the adjustable interior bicycle stand comprising:
    a base having a top with a center and at least three radial members, each radial member extending outwardly from the center, and each of the radial members being disposed with equal angular displacement in relation to each adjacent radial member, the radial members further comprising a first set of holes disposed at a first location and a second set of holes disposed at a second location;
    a first set of vertical supports disposed in mating relation to the first set of holes; and
    a second set of vertical supports disposed in mating relation to the second set of holes,
    wherein each of the vertical supports in the first and second sets of vertical supports has a cradle and an elevating means for adjusting the vertical location of the cradle.

7. The adjustable interior bicycle stand of claim 6, wherein the base further comprises a bottom having a non-slip surface.

8. The adjustable interior bicycle stand of claim 7, wherein the elevating means is a threaded rod.

9. The adjustable interior bicycle stand of claim 8, wherein the first set of holes comprises further a threading means.

10. The adjustable interior bicycle stand of claim 6, wherein one or more holes of the first and second sets of holes are aligned radially along the at least one radial member such that the vertical supports are radially adjustable along the at least one radial members.

11. The adjustable interior bicycle stand of claim 10, wherein the base further comprises a bottom having a non-slip surface.

* * * * *